Jan. 29, 1952   P. P. NEWCOMB   2,583,872
GAS TURBINE POWER PLANT, INCLUDING PLANETARY GEARING
BETWEEN A COMPRESSOR, TURBINE, AND POWER CONSUMER
Filed Aug. 2, 1947
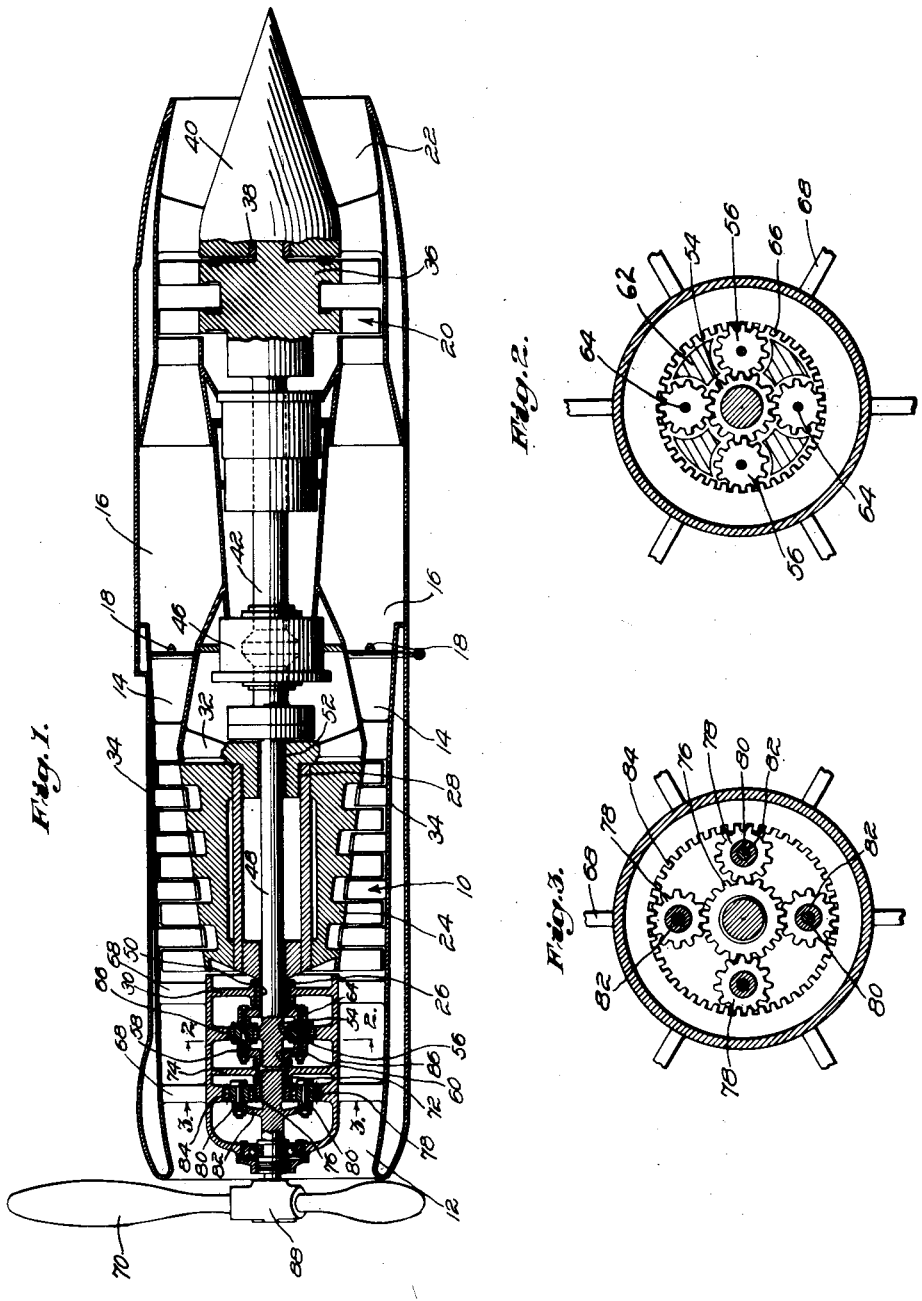
INVENTOR
*Philip P. Newcomb*
BY
*Charles A. Warren*
ATTORNEY Patented Jan. 29, 1952

2,583,872

UNITED STATES PATENT OFFICE 2,583,872

GAS TURBINE POWER PLANT, INCLUDING PLANETARY GEARING BETWEEN A COMPRESSOR, TURBINE, AND POWER CONSUMER

Philip P. Newcomb, Hartford, Conn., assignor to United Aircraft Corporation, East Hartford, Conn., a corporation of Delaware Application August 2, 1947, Serial No. 765,743

8 Claims. (Cl. 60—108)

This invention relates to a gas turbine power plant in which the turbine drives both the compressor and a power consumer such as a propeller.

Unless the compressor is designed specifically for operation at the turbine speed, it is advantageous, for economy purposes, to provide a speed difference between the compressor and the turbine so that both elements may operate at the most favorable speed for best efficiency. This is particularly true in multi-stage compressor and turbines where the efficiency drops off rapidly above or below the design speed. The advantages of the different speeds may be offset in aircraft power plants, however, by the weight increase caused by the speed change mechanism. A feature of this invention is the use of a single change gear device for changing the speed of the driven shaft and also the speed of the compressor with respect to the turbine. Another feature is the drive of the compressor and the driven shaft at the same speed from the turbine through a single change speed device.

It is desirable in many instances to operate the power output shaft at a substantially different speed from the turbine, thereby necessitating one or more change speed mechanisms between the turbine and the power consumer. For example, if the power plant is used to drive a propeller, it may be desirable to have two stages of reduction gear drive in the power supply to the propeller. A feature of the invention is the use of a reduction gear by which to obtain at least one stage in the change of speed between the turbine and the power consumer and simultaneously a reduction in the compressor speed with respect to the turbine.

Other objects and advantages will be apparent from the specification and claims, and from the accompanying drawing which illustrates what is now considered to be a preferred embodiment of the invention.

Fig. 1 is a longitudinal sectional view through the power plant.

Fig. 2 is a sectional view substantially on line 2—2 of Fig. 1.

Fig. 3 is a sectional view substantially on line 3—3 of Fig. 1.

The power plant consists in general of a compressor 10 having an annular inlet 12 and a series of discharge passages 14 which deliver the compressed air to a group of combustion chambers 16 into which fuel may be injected as by nozzles 18. From the combustion chamber the hot gas is delivered to a turbine 20 which discharges through an exhaust duct 22. Both the compressor and the turbine are shown to be of the multi-stage axial flow type although it will be apparent that the particular arrangement of the compressor and turbine is merely illustrative of one particular type for which the invention is adapted.

The compressor rotor 24 is journalled in bearings 26 and 28 located at opposite ends of the rotor and supported by vanes 30 and 32 respectively from the outer housing 34. The turbine rotor 36 is supported in a bearing 38 in the tail cone 40 and the turbine shaft 42 projecting from the inlet side of the turbine rotor may be supported in a bearing housing 46. An extension shaft 48 connected to the turbine shaft is journalled within the compressor rotor as by bearings 50 and 52.

The shaft 48 which rotates with and functions as a part of the turbine shaft carries at its forward end a gear 54, Fig. 2, in mesh with a series of planet gears 56 supported by a cage 58, Fig. 1, which drives both compressor and an intermediate shaft 60. The cage 58 which may be integral with the intermediate shaft, may have axially extending arcuate projections 62 between the gears 56 engaging with the end of the compressor rotor 24. The stub shafts 64 on which the gears 56 are mounted form connections between the intermediate shaft 60 and the compressor rotor 24 so that these parts rotate in unison. The planet gears 56 are in mesh with a ring gear 66 surrounding the planet gears and supported as by struts 68 within the outer housing 34. Thus the compressor rotor and the intermediate shaft 60 rotate at the same speed and at a speed substantially less than the speed of the turbine shaft with this reduction in speed obtained by a single change-speed unit.

The intermediate shaft 60 is connected to a power consumer and in the embodiment illustrated is connected through a speed reduction unit to a propeller 70. In the embodiment, the intermediate shaft 60 is journalled in a bearing 72 supported as by a strut 74 and carries a gear 76 in mesh with a number of planet gears 78 supported by stub shafts 80 on the cage 82. The gears 78 mesh with a ring gear 84 connected to and functionally integral with the same inner housing 86 that supports gear 66. The cage 82 is connected to the propeller hub 88 thereby causing rotation of the propeller at a rate substantially reduced from that of the intermediate shaft.

By this arrangement the reduction gear which provides the first stage of reduction between the turbine and the propeller also serves to provide a change in speed between the turbine shaft and the compressor so that both the turbine and the compressor operate at the most efficient speeds, and, therefore, the overall power plant efficiency is maintained as high as possible. The arrangement of the extension shaft 48 extending through the compressor rotor and driving the rotor from the forward end eliminates the necessity for transmitting the propeller loads through the compressor rotor and as a result the compressor rotor may be made substantially lighter in weight. In fact, the compressor rotor is, as a result, only heavy enough to carry the loads imposed thereon by the blades during the compressor rotation.

It is to be understood that the invention is not limited to the specific embodiment herein illustrated and described, but may be used in other ways without departure from its spirit as defined by the following claims.

I claim:

1. In a power plant, a turbine, a compressor driven by the turbine, and a power consumer also driven by the turbine in combination with a drive shaft connected to the turbine and extending axially through the compressor, a gear on said shaft, a fixed gear surrounding said first gear, a planet gear between said fixed gear and said first gear, a cage supporting said planet gear, a driving connection between the compressor and the planet cage, and means for driving the power consumer from said planet gear cage.

2. In a power plant, a turbine, a compressor driven by the turbine, and a propeller also driven by the turbine, a drive shaft connected to the turbine and extending axially through the compressor, a gear on said shaft, a fixed gear surrounding said first gear, a planet gear between said fixed gear and said first gear, a cage supporting said planet gear, a driving connection between the compressor and the planet cage, and means for driving the propeller from said planet gear cage.

3. In a power plant, a turbine, a compressor driven by the turbine, and a power consumer also driven by the turbine in combination with a drive shaft connected to the turbine and having its axis concentric with the axis of the compressor, a gear on said shaft, a second gear driven by said first gear and having a rotational speed different from the rotational speed of the shaft and a driving connection between said second gear and said compressor and said power consumer.

4. In a power plant, a turbine, a compressor driven by the turbine, and a propeller also driven by the turbine in combination with a drive shaft connected to the turbine and having its axis concentric with the axis of the compressor, a gear on said shaft, a second gear driven by said first gear, said second gear having a rotational speed different from that of the shaft and a driving connection from said second gear to the compressor and to the propeller.

5. In a power plant, a compressor, a turbine connected to and driving said compressor and a power consumer also driven by the turbine in combination with reduction gearing including a sun gear, at least one planet gear and a ring gear, said planet gear interconnecting said ring and sun gears, one of said gears being fixed, one of said gears being drivingly connected to the turbine, and one of said gears being drivingly connected to both the compressor and the power consumer.

6. In a power plant, a compressor, a turbine connected to and driving said compressor, and a propeller also driven by the turbine in combination with reduction gearing including a sun gear, at least one planet gear and a ring gear, said planet gear interconnecting said sun and ring gears, one of said gears being fixed, one of said gears being drivingly connected to the turbine, and one of said gears being drivingly connected to both the compressor and the propeller.

7. An arrangement for a gas turbine power plant including a compressor, a power consumer, a turbine for driving said compressor and said power consumer, a shaft attached to the turbine and extending axially through the compressor, a sun gear on said shaft, a fixed gear, at least one planetary pinion between said sun gear and said fixed gear, a cage for said planetary pinion, a rigid connection between said compressor and said planetary cage and a driving connection between said power consumer and said planetary cage for driving said compressor and said power consumer from said shaft through said planet cage.

8. An arrangement for a gas turbine power plant including a compressor, a turbine for driving said compressor, a shaft attached to the turbine and extending axially through the compressor, a sun gear on said shaft, a fixed gear, at least one planetary pinion between said sun gear and said fixed gear, a cage for said planetary pinion, and a rigid connection between said compressor and said planetary cage for driving said compressor from said shaft through said planet cage.

PHILIP P. NEWCOMB.

REFERENCES CITED

The following references are of record in the file of this patent:

UNITED STATES PATENTS

| Number | Name | Date |
|---|---|---|
| 1,899,963 | Holzwarth | Mar. 7, 1933 |
| 1,934,237 | Russell | Nov. 7, 1933 |
| 2,243,467 | Jendrassik | May 27, 1941 |
| 2,326,072 | Seippel | Aug. 3, 1943 |
| 2,488,783 | Stalker | Nov. 22, 1949 |

FOREIGN PATENTS

| Number | Country | Date |
|---|---|---|
| 203,828 | Great Britain | Sept. 20, 1923 |
| 467,630 | Great Britain | June 21, 1937 |
| 537,286 | Great Britain | June 16, 1941 |